US012718076B1

(12) United States Patent
Kidambi et al.

(10) Patent No.: US 12,718,076 B1
(45) Date of Patent: Aug. 25, 2026

(54) MIXED SIGNAL COMPUTING-IN-MEMORY SOLVER FOR INTEGER CONSTRAINED LEAST SQUARE PROBLEMS

(71) Applicant: Georgia Tech Research Corporation, Atlanta, GA (US)

(72) Inventors: Narasimha Vasishta Kidambi, Atlanta, GA (US); Saibal Mukhopadhyay, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 19/316,384

(22) Filed: Sep. 2, 2025

(51) Int. Cl.
*G06N 3/06* (2006.01)
*G06N 3/044* (2023.01)
(Continued)

(52) U.S. Cl.
CPC ............... *G06N 3/06* (2013.01); *G06N 3/044* (2023.01); *G06N 3/0495* (2023.01); *G06N 3/065* (2023.01);
(Continued)

(58) Field of Classification Search
CPC ........ G06N 3/06; G06N 3/044; G06N 3/0495; G06N 3/065; G06F 2212/221; G06F 2119/10; G06F 9/3893; G05B 2219/21137
See application file for complete search history.

(56) References Cited

U.S. PATENT DOCUMENTS 10,915,298 B1 * 2/2021 Far ......................... G06N 3/065
2014/0266832 A1 * 9/2014 Schrom ................. H02M 3/158
341/144

(Continued)

OTHER PUBLICATIONS

Kidambi et al., "A Mixed-Integer Computing-im-Memory Solver for Integer Constrained Least Square Problems" Jun. 27, 2025, IEEE, pp. 1-5. (Year: 2025).*

(Continued)

*Primary Examiner* — Miranda M Huang
*Assistant Examiner* — Chase P. Hinckley
(74) *Attorney, Agent, or Firm* — Perilla Knox & Hildebrandt LLP; Jonathan A. Paulis

(57) ABSTRACT

A mixed signal computing-in-memory (CIM) system solves integer constrained least square (ICLS) optimization problems through parallel analog computation within memory arrays. The system transforms ICLS problems into energy minimization problems solved using Hopfield neural network dynamics. A first CIM component performs iterative optimization using quantized weights stored in memory arrays, with analog current accumulation providing parallel computation and stochastic feedback enabling escape from local minima. A second CIM component evaluates solution quality through distance metric computation. The system converts integer optimization variables to binary representations suitable for neural network processing. Binary neuron states are generated through current comparison and modified with programmable noise injection for global optimization. The system supports constant time operation for predictable latency and dynamic time operation for faster convergence. The CIM approach eliminates data movement bottlenecks while achieving significant speedup and energy efficiency compared to conventional digital processing methods for solving nondeterministic polynomial time-complete ICLS problems.

20 Claims, 9 Drawing Sheets

(51) Int. Cl.

| | |
|---|---|
| ***G06N 3/0495*** | (2023.01) |
| ***G06N 3/065*** | (2023.01) |
| *G06F 9/38* | (2018.01) |
| *G06F 119/10* | (2020.01) |

(52) U.S. Cl.
CPC .. *G05B 2219/21137* (2013.01); *G06F 9/3893* (2013.01); *G06F 2119/10* (2020.01); *G06F 2212/221* (2013.01)

(56) References Cited

U.S. PATENT DOCUMENTS

| | | | | |
|---|---|---|---|---|
| 2023/0178125 | A1* | 6/2023 | Roy | G11C 7/1012 341/155 |
| 2023/0188146 | A1* | 6/2023 | Kim | H03M 1/002 341/163 |
| 2023/0244901 | A1* | 8/2023 | Trivedi | G11C 29/028 706/15 |
| 2023/0344684 | A1* | 10/2023 | Levy | H04L 25/4902 |
| 2024/0020093 | A1* | 1/2024 | Dorrance | G06F 7/483 |
| 2024/0194276 | A1* | 6/2024 | Chen | G11C 16/3459 |
| 2024/0281662 | A1* | 8/2024 | Kim | G06N 3/045 |
| 2025/0150138 | A1* | 5/2025 | Lee | H04L 25/0254 |
| 2025/0231804 | A1* | 7/2025 | Yun | G06N 3/0464 |

OTHER PUBLICATIONS

Numan et al., "Acore-CIM: build accurate and reliable mixed-signal CIM cores with RISC-V controlled self-calibration" Jun. 18, 2025, arXiv: 2506.15440v1, pp. 1-12. (Year: 2025).*

Wang et al., "MIX-ACIM: A 28-nm Mixed-Precision Analog Compute-in-Memory with Digital Feature Restoration for Vector-Matrix Multiplication" Aug. 12, 2025, pp. 213-216. (Year: 2025).*

Dee et al., "A 10.8mW Mixed-Signal Simulated Bifurcation Ising Solver using SRAM Compute-In-Memory with 0.6μs Time-to-Solution" Apr. 14, 2025, aXiv: 2504.10384v1, pp. 1-4. (Year: 2025).*

Chen et Han, "Solving Least-Squares Fitting in O(1) Using RRAM-based Computing-in-Memory Technique" Feb. 21, 2022, IEEE, pp. 1-6. (Year: 2022).*

Jaiswal et al., "8T SRAM Cell as a Multi-bit Dot Product Engine for Beyond von-Neumann Computing" Oct. 16, 2018, arXiv: 1802.08601v2, pp. 1-10. (Year: 2018).*

Sharma et al., "AFE-CIM: A Current-Domain Comute-In-Memory Macro for Analog-to-Feature Extraction" Oct. 6, 2023, IEEE, pp. 33-36. (Year: 2023).*

Trivedi et al., "MOSAIC: Collaborative Compute-in-Memory uArrays for Flexible and Scalable Deep Learning" Jun. 10, 2025, IEEE, pp. 1-4. (Year: 2025).*

Wu et al., "Uniform Memory Retrieval with Larger Capacity for Modern Hopfield Networks" Nov. 10, 2024, arXiv: 2404.03827v3, pp. 1-45. (Year: 2024).*

"Simple 'neural' optimization networks: An A/D converter, signal decision circuit, and a linear programming circuit," IEEE Transactions on Circuits and Systems, vol. 33, No. 5, pp. 533-541, May 1986, doi: 10.1109/TCS.1986.1085953.

Daehyun Kim, Nael Mizanur Rahman, and Saibal Mukhopadhyay, "A 32.5 mW mixed-signal processing-in-memory-based k-SAT solver in 65 nm CMOS with 74.0% solvability for 30-variable 126-clause 3-SAT problems," in Proc. IEEE Int. Solid-State Circuits Conf. (ISSCC), San Francisco, CA, USA, Feb. 2023, pp. 466-468.

H. Lo, W. Moy, H. Yu, S. Sapatnekar, and C. H. Kim, "An Ising solver chip based on coupled ring oscillators with a 48-node all-to-all connected array architecture," Nature Electronics, vol. 6, pp. 760-769, Aug. 2023, doi: 10.1038/s41928-023-01021-y.

H. Noguchi, J. Tani, Y. Shimai, H. Kawaguchi, and M. Yoshimoto, "Parallel-processing VLSI architecture for mixed integer linear programming," in Proc. IEEE Int. Symp. Circuits and Systems (ISCAS), 2010, pp. 2362-2365.

J. Bae, W. Oh, J. Koo, and B. Kim, "CTLE-Ising: A 1440-spin continuous-time latch-based Ising machine with one-shot fully-parallel spin updates featuring equalization of spin states," in Proc. IEEE Int. Solid-State Circuits Conf. (ISSCC), Feb. 2024.

M. Chang, X. Yin, Z. Toroczkai, X. Hu, and A. Raychowdhury, "An analog clock-free compute fabric based on continuous-time dynamical system for solving combinatorial optimization problems," in Proc. IEEE Custom Integrated Circuits Conf. (CICC), 2022.

N. V. Kidambi, W.-C. Wang, D. Kim, S. Sharma, N. M. Rahman, S. Zhang, and S. Mukhopadhyay, "A mixed-signal computing-in-memory solver for integer constrained least square problems," in Proc. IEEE Custom Integrated Circuits Conf. (CICC), 2023.

S. Sharma, W.-C. Wang, C. DeLude, M. Lee, N. M. Rahman, N. V. Kidambi, J. Romberg, and S. Mukhopadhyay, "AFE-CIM: A current-domain compute-in-memory macro for analog-to-feature extraction," in Proc. IEEE Custom Integrated Circuits Conf. (CICC), 2023.

Shanshan Xie, Mengtian Yang, S. Andrew Lanham, Yipeng Wang, Meizhi Wang, Sirish Oruganti, and Jaydeep P. Kulkarni, "Snap-SAT: A one-shot energy-performance-aware all-digital compute-in-memory solver for large-scale hard Boolean satisfiability problems," in Proc. IEEE Int. Solid-State Circuits Conf. (ISSCC), San Francisco, CA, USA, Feb. 2023, pp. 468-470.

Y. Su, T. T.-H. Kim, and B. Kim, "FlexSpin: A scalable CMOS Ising machine with 256 flexible spin processing elements for solving complex combinatorial optimization problems," in Proc. IEEE Int. Solid-State Circuits Conf. (ISSCC), Feb. 2022, pp. 274-275.

* cited by examiner

400C

400D

MIXED SIGNAL COMPUTING-IN-MEMORY SOLVER FOR INTEGER CONSTRAINED LEAST SQUARE PROBLEMS

BACKGROUND

Integer Constrained Least Square (ICLS) problems arise in various fields including signal processing, wireless communications, logistics planning, and scheduling optimization. These problems require finding integer-valued solutions that minimize the squared error between observed data and model predictions, formally expressed as minimizing $\|y-Hz\|^2$, where z is constrained to integer values. The integer constraint makes these problems computationally intensive, as these problems belong to the class of nondeterministic polynomial time-complete (NP-complete) problems, meaning no known polynomial time algorithm exists for finding optimal solutions in the general case.

Traditional computing architectures face significant challenges when solving ICLS problems due to the von Neumann bottleneck, where data must be transferred between memory and processing units. This data movement consumes substantial time and energy, particularly as problem dimensions increase. Additionally, conventional digital processors must evaluate potential solutions sequentially or with limited parallelism, leading to extended computation times for large scale problems. For example, software solvers can require seconds to solve even moderate-sized ICLS problems with 20 variables.

Various approaches have been explored for accelerating combinatorial optimization problems. Digital accelerators can provide some speedup but remain limited by sequential processing constraints and power consumption. Analog computing approaches can offer improved energy efficiency but typically struggle with precision and programmability requirements. Computing-in-memory (CIM) architectures have emerged as a promising approach to reduce data movement, but implementing complex optimization algorithms within memory arrays presents significant design challenges. Hardware implementations of optimization algorithms, including neural network-based approaches, have shown promise, but achieving the right balance between performance, flexibility, and solution quality remains challenging.

The demand for rapid solution of ICLS problems continues to grow across multiple application domains. Real-time signal processing, 5G/6G communication systems, and resource allocation tasks increasingly require faster, more energy-efficient solvers that can handle larger problem sizes while maintaining high solution quality. Current solutions often force designers to choose between solution speed and quality, limiting the practical deployment of ICLS-based algorithms in latency critical applications.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
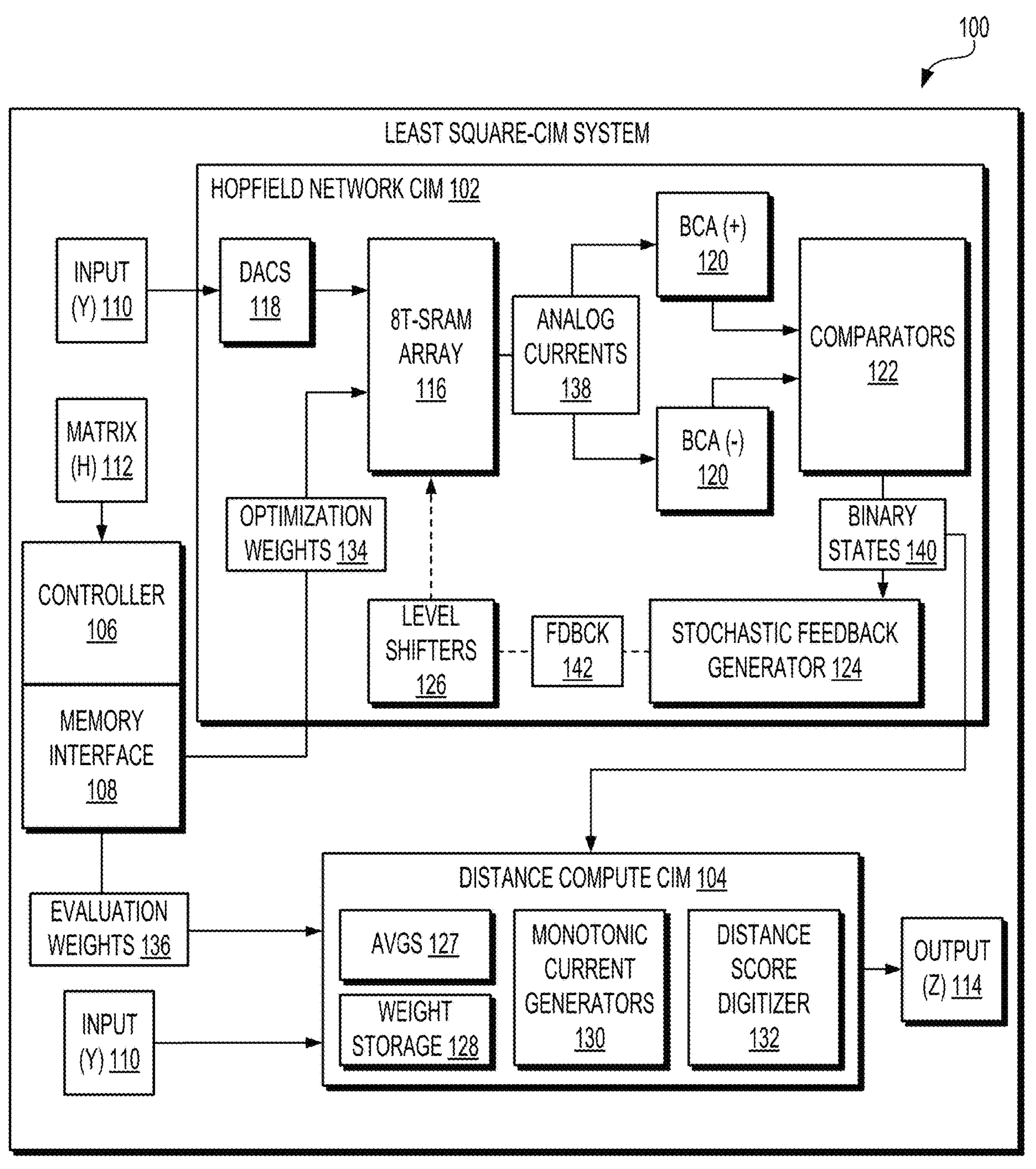
FIG. 1 depicts a block diagram of a least square computing-in-memory (LS-CIM) system for solving integer constrained least square problems according to an example implementation.

The present disclosure addresses the computational challenges of solving integer constrained least square (ICLS) problems, which require finding integer-valued solutions z that minimize the L2 norm $\|y-Hz\|^2$ subject to constraints that all elements of z belong to a discrete set, such as $\{0, 1, 2, 3\}$. These problems are fundamental to numerous applications including signal processing for wireless communications, channel equalization, multiple-input multiple-output (MIMO) detection, resource allocation in logistics, and scheduling optimization. The nondeterministic polynomial time-complete (NP-complete) nature of ICLS problems means that the computational complexity grows exponentially with problem size, making traditional solution approaches impractical for real-time applications or large-scale systems.

The computational burden of ICLS problems stems from several factors. First, the discrete nature of the solution space requires exhaustive search or sophisticated optimization techniques to find near-optimal solutions. For a problem with N variables each taking one of four possible values, the solution space contains $4^N$ possible combinations. Second, evaluating the objective function $\|y-Hz\|^2$ for each candidate solution requires matrix-vector multiplication and norm computation, operations that are computationally expensive when performed repeatedly. Third, the need to escape local minima in the optimization landscape requires additional computational mechanisms such as stochastic search or simulated annealing.

Existing solutions for ICLS problems face significant limitations. Software-based solvers, such as CVXPY running on modern multi-core processors, can provide high-quality solutions but require substantial computation time (e.g., 2 seconds or more for problems with 20 variables). This latency makes software solvers unsuitable for real-time applications. Digital hardware accelerators can reduce computation time but remain constrained by the von Neumann architecture, where data movement between memory and processing units creates bottlenecks and increases power consumption. Previous computing-in-memory (CIM) approaches have focused on simpler linear algebra operations or binary optimization problems, lacking the capability to efficiently handle the specific requirements of integer-constrained optimization with continuous-valued coefficients.

The present disclosure provides a mixed signal CIM architecture that transforms ICLS problems into an equivalent energy minimization problem solved through analog computation within memory arrays. The solution leverages the natural dynamics of a Hopfield neural network implemented in hardware, where the stable states of the Hopfield neural network correspond to candidate solutions of the ICLS problem. By performing computation directly where data is stored, the architecture eliminates the von Neumann bottleneck and achieves massive parallelism through analog current mode operations.

The disclosed LS-CIM system employs a dual-CIM architecture with distinct optimization and evaluation engines. A Hopfield Network CIM (HN-CIM) block implements the iterative optimization using 4-bit quantized weights stored in an 8-transistor static random-access memory (8T-SRAM) array, with analog current accumulation providing parallel computation of weighted sums. A separate Distance Compute CIM (DC-CIM) block continuously evaluates solution quality using 3-bit quantized weights and monotonic current generators that directly compute squared difference terms. This separation allows the LS-CIM system to optimize using Hopfield dynamics while monitoring true objective function values, ensuring high-quality solutions.

The disclosed LS-CIM system includes a transformation methodology that converts integer variables to binary representations suitable for Hopfield network implementation, enabling the encoding $z_i = x_{2i-1} + 2x_{2i}$ where binary variables x are processed by the neural network. The LS-CIM system incorporates a stochastic feedback generator that injects controlled noise through programmable logic operations, with experimental results demonstrating that XOR-based noise injection provides optimal solution quality by effectively escaping local minima. The architecture supports both constant time mode (CTM) operation for predictable latency and dynamic time mode (DTM) operation for faster convergence when possible.

The advantages of the disclosed LS-CIM system over existing solutions are substantial and measurable. Compared to software solvers running on 8-core processors, for instance the LS-CIM system achieves a 2900× speedup in CTM operation (720 microseconds vs. 2 seconds) and up to 40,000× speedup in DTM operation (51.7 microseconds vs. 2 seconds) while maintaining solution quality in the $99.98^{th}$ percentile. The mixed signal approach enables low power consumption of only 21.76 milliwatt at 1.2 volts (V) in 65 nanometer complementary metal-oxide semiconductor (CMOS) technology, orders of magnitude lower than digital processors performing equivalent computations. The compact implementation requires only 0.27 square millimeters of silicon area, enabling integration into edge devices and embedded systems.

The parallel processing capability of the disclosed architecture fundamentally changes the scaling characteristics of ICLS problem solving. While traditional approaches suffer from exponential growth in computation time, the LS-CIM system can perform all weighted sum computations in parallel through analog current accumulation, with computation time remaining relatively constant regardless of problem complexity within the array dimensions. A 52×256 array configuration, for example, can process 20-input, 16-output ICLS problems in a single macro, with the architecture scalable to larger problems through multiple macros or time-multiplexing techniques.

The practical implications of these improvements enable new applications previously infeasible due to computational constraints. Real-time signal processing systems can now incorporate ICLS-based algorithms for improved accuracy. Wireless communication systems can implement more sophisticated detection and equalization schemes. Edge computing devices can perform complex optimization tasks locally without relying on cloud resources. The combination of high speed, low power, and compact size makes the LS-CIM architecture particularly suitable for deployment in resource-constrained environments while maintaining near-optimal solution quality comparable to exhaustive software methods.

FIG. 1 depicts a least square computing-in-memory (LS-CIM) system 100 for solving integer constrained least square (ICLS) optimization problems according to an example implementation. The LS-CIM system 100 provides a mixed signal hardware architecture that transforms ICLS problems into energy minimization problems solved through parallel analog computation within memory arrays. The LS-CIM system 100 receives input vector data and matrix coefficients and generates integer-constrained output solutions through a combination of stochastic neural network processing and distance computation.

The LS-CIM system 100 includes a Hopfield Network CIM (HN-CIM) block 102, a distance compute CIM (DC-CIM) block 104, a controller 106, and a memory interface 108. Input data to the LS-CIM system 100 includes an input vector (Y) 110 and a matrix (H) 112. The LS-CIM system 100 generates an output vector (Z) 114 containing integer solutions to the ICLS problem. The DC-CIM block 104 receives both the binary states from the HN-CIM block 102 and the original input vector (Y) 110, with the input vector (Y) 110 being converted to analog form for distance metric computation.

The controller 106 is a digital control circuit that manages the operation of the LS-CIM system 100. The controller 106 may be implemented as a finite state machine (FSM), a microcontroller, or dedicated digital logic circuitry including sequencers, timing generators, and control registers. The controller 106 receives the matrix (H) 112 and processes the matrix (H) 112 to generate appropriate weight values for both the HN-CIM block 102 and the DC-CIM block 104. The controller 106 coordinates weight programming, generates timing signals for computation phases, and monitors convergence by tracking changes in binary states 140. The controller 106 may operate the LS-CIM system 100 in different modes, including a constant time mode (CTM) where computation runs for a fixed duration, and a dynamic time mode (DTM) where computation continues until convergence criteria are met, such as when the Hamming distance between successive state vectors falls below a threshold.

The memory interface 108 is a digital circuit block that provides addressing, data routing, and control signals for programming and accessing memory arrays within the LS-CIM system 100. The memory interface 108 may include address decoders, write drivers, sense amplifiers, data multiplexers, and control logic. The memory interface 108 enables the controller 106 to program weight values before computation begins and includes separate data paths for optimization weights 134 and evaluation weights 136. The memory interface 108 may implement row and column decoders for addressing specific memory locations and write circuitry capable of programming multi-bit values into the CIM arrays.

The HN-CIM block 102 is a mixed signal computing circuit that implements a stochastic Hopfield neural network for iterative optimization. A Hopfield network is a recurrent neural network that converges to energy minima through iterative state updates, and the HN-CIM block 102 realizes this mathematically in hardware through analog current accumulation and digital state feedback. The HN-CIM block 102 includes an 8-transistor static random-access memory (8T-SRAM) array 116, digital-to-analog converters (DACs) 118, binary current accumulators (BCAs) 120, comparators 122, a stochastic feedback generator 124, and level shifters 126.

The 8T-SRAM array 116 is a memory array including 52 rows and 256 columns of 8-transistor SRAM cells, where each cell includes six transistors forming a standard SRAM storage element plus two additional transistors enabling separate read and write ports. The dual-port nature allows simultaneous read operations for computation while maintaining stored weight values. The 8T-SRAM array 116 is configured for mixed signal computation where stored digital weight values modulate analog currents 138. In one implementation, 20 rows of the 8T-SRAM array 116 receive analog input signals corresponding to elements of the input vector (Y) 110 through analog wordlines (A-WL), while 32 rows receive binary neuron states through a feedback path. The 8T-SRAM array 116 stores optimization weights 134 received from the memory interface 108. The optimization weights 134 may be 4-bit signed values representing elements of a weight matrix derived from the input matrix (H) 112 and transformed according to Hopfield network energy function requirements.

The DACs 118 are current-domain digital-to-analog converters that transform digital input values into proportional analog currents. Each DAC 118 may include binary-weighted current sources controlled by digital input bits, with transistor-based current mirrors ensuring accurate current ratios. In one example implementation, the DACs 118 may include twenty 5-bit converters that receive digital elements of the input vector (Y) 110 and generate analog voltages proportional to these input values. The generated analog voltages are applied to analog wordlines connected to the top 20 rows of the 8T-SRAM array 116, where the voltage magnitude represents the corresponding input value.

The 8T-SRAM array 116 performs parallel multiply-accumulate operations, where currents from multiple cells connected to a common bitline naturally sum together. When an analog wordline activates a cell storing a weight value, the cell conducts a current proportional to both the input signal and the stored weight, generating the analog currents 138. The analog currents 138 flow through read bitlines (R-BL) to the BCAs 120.

The BCAs 120 are analog current processing circuits that separately accumulate weighted current contributions based on weight polarity. Each BCA 120 includes current mirrors arranged in a binary-weighted configuration, allowing efficient summation of currents from multiple columns. The BCA (+) 120 accumulates currents from memory cells storing positive weights using p-channel metal-oxide semiconductor (PMOS) current mirrors, while the BCA (−) 120 accumulates currents from memory cells storing negative weights using n-channel metal oxide semiconductor (NMOS) current mirrors. Each BCA 120 processes currents from all 256 columns of the 8T-SRAM array 116, with the accumulated currents representing the positive and negative components of the weighted sum computation.

The comparators 122 are analog circuits that generate digital outputs based on the relative magnitudes of two analog inputs. Each comparator 122 may be implemented as a differential amplifier followed by a digital buffer stage. The comparators 122 receive the accumulated positive and negative currents from the BCAs 120 and generate binary states 140 by determining which current is larger. The comparators 122 may include 32 circuits, one for each neuron, generating 32 binary neuron states that represent the current state of the Hopfield network.

The stochastic feedback generator 124 is a digital circuit that introduces controlled randomness into the optimization process to enable escape from local minima. The stochastic feedback generator 124 may include a 32-bit linear feedback shift register (LFSR) or other pseudo-random number generator (PRNG) that produces pseudo-random bit sequences. Digital logic gates (AND, OR, XOR) combine these random bits with the binary states 140 from the comparators 122 according to a programmable noise injection scheme. In constant time mode (CTM) operation, the stochastic feedback generator 124 sequentially cycles through four different noise injection modes, i.e., XOR, OR, AND, and no noise, with each mode operating for approximately 180 microseconds (μs) to evaluate different perturbation strategies. In dynamic time mode (DTM) operation, the stochastic feedback generator 124 may use a single optimized noise pattern. The stochastic feedback generator 124 outputs modified binary states as feedback (FDBCK) 142, where the degree and type of randomness can be controlled to balance exploration and exploitation during optimization.

The level shifters 126 are analog/digital interface circuits that translate voltage levels between different domains. Each level shifter 126 may include complementary transistor pairs arranged to convert digital logic levels (e.g., 0V to VDD) to analog voltage ranges suitable for the 8T-SRAM array 116 operations. The level shifters 126 may include 32 circuits that receive the feedback 142 from the stochastic feedback generator 124 and adjust voltage levels to match the analog operating range of the 8T-SRAM array 116. The level-shifted signals are applied to analog wordlines connected to the bottom 32 rows of the 8T-SRAM array 116, ensuring consistent current generation across both input and feedback signals.

The DC-CIM block 104 is a mixed signal computing circuit specialized for distance metric computation. Unlike the iterative optimization in the HN-CIM block 102, the DC-CIM block 104 performs a single-pass evaluation to measure solution quality according to the L2 norm. The DC-CIM block 104 receives the binary states 140 from the comparators 122 in the HN-CIM block 102 and the input vector (Y) 110. The DC-CIM block 104 can include analog voltage generators (AVGs) 127 to convert the input vector (Y) 110 to analog voltages, weight storage 128, monotonic current generators 130, and a distance score digitizer 132.

The weight storage 128 is a memory array specifically designed for storing matrix coefficients used in distance computation. The weight storage 128 may be implemented as an SRAM array similar to the 8T-SRAM array 116 but optimized for 3-bit weight storage, or as a dedicated register file with separate storage for positive and negative weight components. The weight storage 128 receives evaluation weights 136 from the memory interface 108, where the evaluation weights 136 represent elements of the input matrix (H) 112 quantized to 3-bit precision. The reduced bit width compared to the optimization weights 134 reflects the different precision requirements for evaluation versus optimization.

The monotonic current generators 130 are analog circuits that produce output currents with a specific non-linear characteristic optimal for distance computation. Each monotonic current generator 130 includes a pull-up network implemented with PMOS transistors and a pull-down network implemented with NMOS transistors, arranged in series and sized to create a specific current-voltage relationship. When positive and negative input currents are equal, the intermediate node voltage equals the trip point of a subsequent inverter, causing maximum short-circuit current flow. This monotonic current characteristic effectively computes the individual terms ($y_k - h_k T_z$) of the distance metric, where squaring and summation of these terms yields the L2 distance. In one example implementation, the monotonic current generators 130 include 20 circuits corresponding to the 20 elements of the output vector computation, each receiving analog voltages representing elements of the input vector (Y) 110 from the AVGs 127 and performing vector-matrix multiplication with the binary states 140 and the corresponding row of the evaluation weights 136 to generate currents proportional to the squared difference terms.

The distance score digitizer 132 is an analog-to-digital converter (ADC) circuit that transforms the aggregate analog current into a digital value. The distance score digitizer 132 may be implemented as a current-mode ADC, such as a successive approximation register (SAR) ADC or a flash ADC optimized for current inputs. The distance score digitizer 132 sums the monotonic currents from all 20 monotonic current generators 130 through current addition at a common node, then converts the total current to a digital value representing the distance $\|y-Hz\|^2$. This digital distance score can be provided to the controller 106 for convergence detection and solution quality assessment.

During operation, the LS-CIM system 100 transforms the ICLS problem of finding an integer vector Z that minimizes $\|y-Hz\|^2$ into an equivalent energy minimization problem solved by the Hopfield network in the HN-CIM block 102. The transformation maps the original problem to a quadratic energy function where the stable states of the Hopfield network correspond to candidate solutions. The analog currents 138 flowing through the 8T-SRAM array 116 compute weighted sums in parallel through current-mode operation, achieving massive parallelism with low power consumption. The feedback path through the stochastic feedback generator 124 and the level shifters 126 enables iterative refinement, where each iteration updates all 32 neuron states simultaneously based on the current energy landscape. The DC-CIM block 104 continuously evaluates solution quality using the binary states 140, computing the actual objective function value rather than the transformed energy. This dual computation approach allows the LS-CIM system 100 to optimize using the Hopfield dynamics while monitoring true solution quality.

The output (Z) 114 provides a 16-element vector where each element is a 2-bit integer value (e.g., 0, 1, 2, or 3), derived from pairs of binary neuron states according to the encoding $z_i = x_{2i-1} + 2x_{2i}$. This encoding satisfies the integer constraints of the ICLS problem while achieving solution quality in the $99.98^{th}$ percentile compared to exhaustive search methods and is achieved with 720 microsecond (μs) computation time and 21.76 milliwatt (mW) power consumption at 1.2 volts (V) in a 65 nanometer (nm) CMOS.

Figure 2:
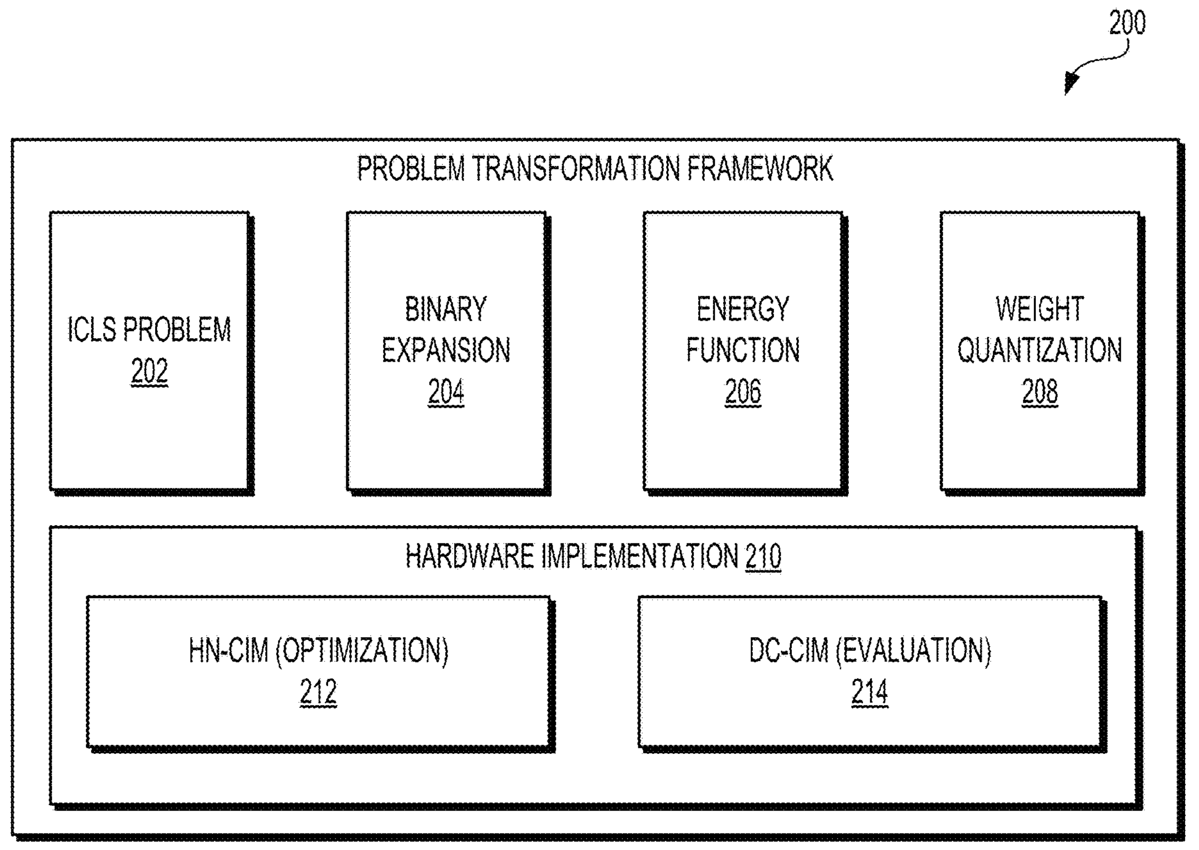
FIG. 2 depicts a problem transformation framework showing the progression from an integer constrained least square (ICLS) problem through mathematical transformations to hardware implementation in CIM blocks according to an example implementation.

FIG. 2 depicts a problem transformation framework 200 for converting an ICLS optimization problem into a hardware-implementable form according to an example implementation. The problem transformation framework 200 demonstrates the mathematical and computational transformations used to map the ICLS problem to mixed signal compute-in-memory (MS-CIM) hardware.

The problem transformation framework 200 includes four transformation stages and a hardware implementation section 210. The transformation stages include an ICLS problem block 202, a binary expansion block 204, an energy function block 206, and a weight quantization block 208.

The ICLS problem block 202 represents the original optimization problem formulation. The ICLS problem seeks to find an integer vector z that minimizes the L2 norm $\|y-Hz\|^2$ subject to integer constraints, where elements of z belong to a discrete set, such as {0, 1, 2, 3}. The ICLS problem block 202 represents the starting point of the transformation, where y corresponds to the input vector (Y) 110 of FIG. 1 with dimension M×1 (such as 20×1), H corresponds to the matrix (H) 112 of FIG. 1 with dimension M×N (such as 20×16), and z corresponds to the output vector (Z) 114 of FIG. 1 with dimension N×1 (such as 16×1) containing 2-bit integer elements.

The binary expansion block 204 represents the transformation of integer variables to binary variables. Since the Hopfield network operates with binary neurons, each integer variable $z_i$ is expanded into binary form using the relationship $z_i = x_{2i-1} + 2x_{2i}$, where x represents binary variables. The binary expansion block 204 converts the 16 integer outputs into 32 binary neuron states, which correspond to the binary states 140 generated by the comparators 122 in the HN-CIM block 102 of FIG. 1. This transformation enables the use of binary neural network hardware for solving the ICLS problem.

The energy function block 206 represents the mapping of the ICLS problem to a Hopfield network energy function. The energy function block 206 converts the least square minimization problem into a quadratic energy function suitable for implementation in a Hopfield neural network. The energy function incorporates terms for the objective function and additional terms to enforce binary constraints on the neuron states. This mathematical reformulation allows the problem to be solved through the natural dynamics of the Hopfield network implemented in the HN-CIM block 102 of FIG. 1, which converges to local energy minima through the feedback loop including the stochastic feedback generator 124 and the level shifters 126.

The weight quantization block 208 represents the conversion of continuous-valued weights to discrete representations suitable for digital storage in memory. The theoretical Hopfield network uses continuous weights, but practical hardware implementation uses quantized values. The weight quantization block 208 includes two quantization schemes: 4-bit quantization for optimization weights that become the optimization weights 134 stored in the 8T-SRAM array 116 of FIG. 1, and 3-bit quantization for evaluation weights that become the evaluation weights 136 stored in the weight storage 128 of FIG. 1. This quantization process balances hardware efficiency with solution quality.

The hardware implementation section 210 shows how the transformed problem maps to physical computing circuits. The hardware implementation section 210 includes an HN-CIM (optimization) block 212 and a DC-CIM (evaluation) block 214.

The HN-CIM (optimization) block 212 implements the optimization engine based on the Hopfield network dynamics and corresponds to the HN-CIM block 102 of FIG. 1. The HN-CIM (optimization) block 212 receives the quantized 4-bit weights derived from the energy function transformation and implements the iterative optimization process using mixed signal circuits. The HN-CIM (optimization) block 212 uses the 8T-SRAM array 116, the DACs 118, the BCAs 120, the comparators 122, the stochastic feedback generator 124, and the level shifters 126 of FIG. 1 to perform analog current-mode computation for parallel processing while maintaining digital storage of weights and neuron states.

The DC-CIM (evaluation) block 214 implements the evaluation engine for assessing solution quality and corresponds to the DC-CIM block 104 of FIG. 1. The DC-CIM (evaluation) block 214 receives 3-bit quantized weights representing the original matrix H and computes the actual objective function value $\|y-Hz\|^2$ for the current solution. The DC-CIM (evaluation) block 214 uses the weight storage 128, monotonic current generators 130, and distance score digitizer 132 of FIG. 1 to perform this evaluation. This separation of optimization in the HN-CIM (optimization) block 212 and evaluation in the DC-CIM (evaluation) block 214 allows the system to use Hopfield dynamics for finding solutions while monitoring the true objective function value.

The problem transformation framework 200 illustrates how mathematical transformations enable the mapping of a complex optimization problem to efficient mixed signal hardware. The progression from the ICLS problem block 202 through the binary expansion block 204, the energy function block 206, and the weight quantization block 208 creates a hardware-implementable form that maintains solution quality while achieving significant speedup and energy efficiency compared to traditional digital computing approaches. The transformation stages in the problem transformation framework 200 are realized through the controller 106 and memory interface 108 of FIG. 1, which process the input matrix (H) 112 and program the appropriate quantized weights into the respective CIM blocks.

Figure 3:
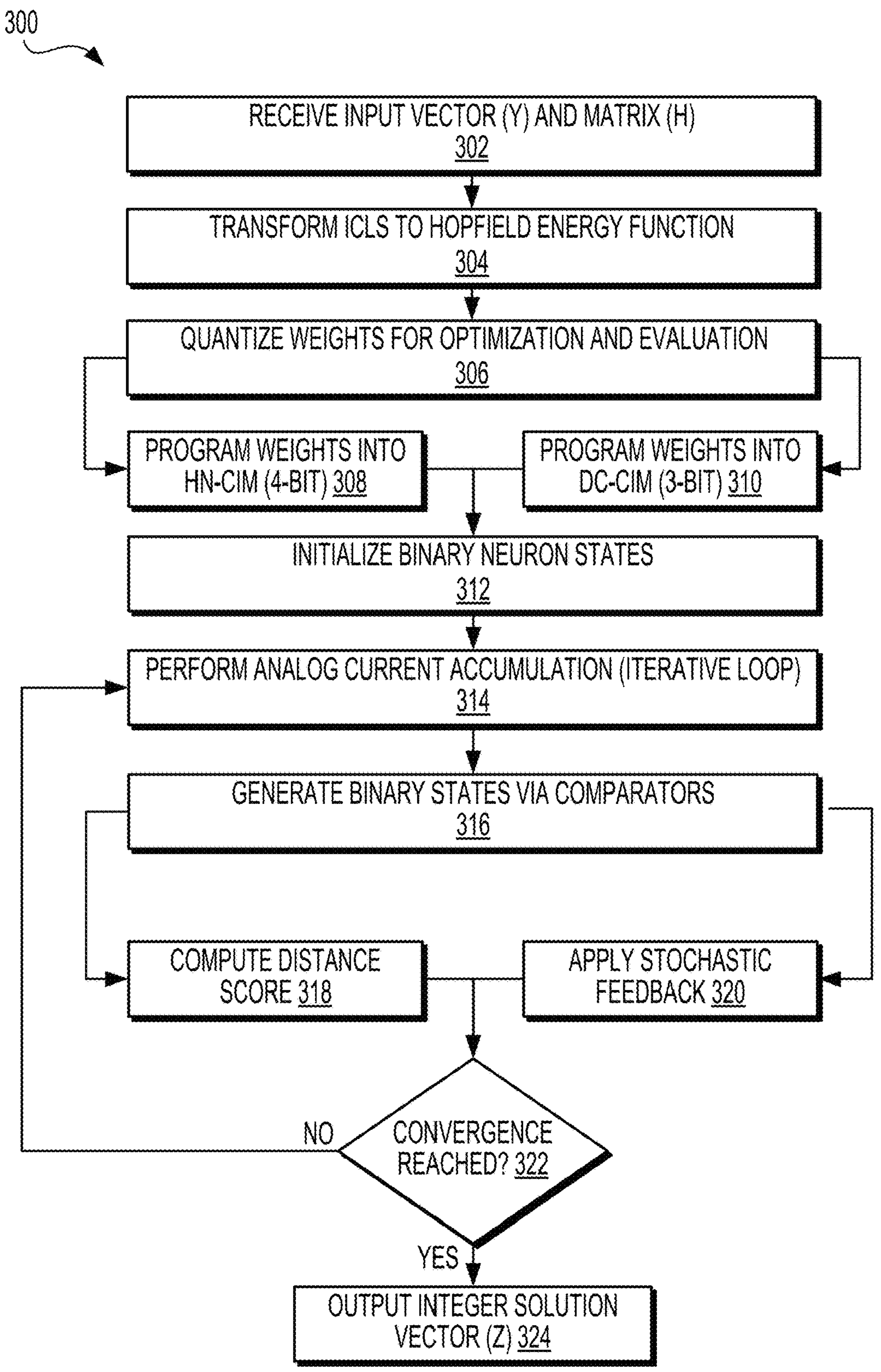
FIG. 3 depicts a method for solving ICLS problems using parallel CIM operations with iterative optimization and convergence detection according to an example implementation.

FIG. 3 depicts a method 300 for solving ICLS problems using mixed signal CIM hardware according to an example implementation. The method 300 demonstrates the operational flow from receiving input data through iterative optimization to generating an integer solution vector. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

The method 300 begins at block 302 where the LS-CIM system 100 receives an input vector (Y) and a matrix (H). The input vector (Y) corresponds to the input vector 110 of FIG. 1 and may have dimension M×1, such as 20×1. The matrix (H) corresponds to the matrix 112 of FIG. 1 and may have dimension M×N, such as 20×16. These inputs define the ICLS problem to be solved, where the goal is to find an integer vector z that minimizes $\|y-Hz\|^2$ subject to integer constraints.

At block 304, the LS-CIM system 100 transforms the ICLS problem to a Hopfield energy function. This transformation converts the least square minimization problem into a quadratic energy function suitable for implementation in a Hopfield neural network. The transformation includes expanding integer variables into binary form using the relationship $z_i=x_{2i-1}+2x_{2i}$, converting 16 integer outputs into 32 binary neuron states. This transformation enables the use of binary neural network hardware as implemented in the HN-CIM block 102 of FIG. 1.

At block 306, the LS-CIM system 100 quantizes weights for both optimization and evaluation. The continuous-valued weights from the energy function are converted to discrete representations suitable for digital storage. The quantization process generates two sets of weights: 4-bit weights for optimization (e.g., the optimization weights 134) and 3-bit weights for evaluation (e.g., evaluation weights 136), balancing hardware efficiency with solution quality.

The method 300 then proceeds with parallel weight programming operations. At block 308, the LS-CIM system 100 programs 4-bit weights into the HN-CIM, storing the 4-bit weights in the 8T-SRAM array 116 of FIG. 1 as the optimization weights 134. In parallel, at block 310, the LS-CIM system 100 programs 3-bit weights into the DC-CIM block, storing the 3-bit weights in the weight storage 128 of FIG. 1 as the evaluation weights 136. This parallel programming reduces initialization time, although serial programming may be used alternatively.

At block 312, the LS-CIM system 100 initializes the binary neuron states 140. The 32 binary neuron states may be initialized randomly or to predetermined values. These initial states serve as the starting point for the iterative optimization process.

The method 300 then enters an iterative optimization loop. At block 314, the LS-CIM system 100 performs analog current accumulation, which represents the core computation of the Hopfield network. The 8T-SRAM array 116 of FIG. 1 performs parallel multiply-accumulate operations through current-mode computation, where currents from activated memory cells naturally sum along bitlines. This block computes weighted sums of inputs and current neuron states using the programmed 4-bit weights.

At block 316, the LS-CIM system 100 generates binary states via comparators. The comparators 122 of FIG. 1 compare positive and negative accumulated currents from the BCAs 120 to determine new binary states for each of the 32 neurons. These binary states represent the current solution state of the Hopfield network.

The method 300 then performs two parallel operations using the generated binary states. At block 318, the LS-CIM system 100 computes a distance score using the DC-CIM block 104 of FIG. 1. The DC-CIM block 104 receives both the binary states 140 and analog representations of the input vector (Y) 110 through the AVGs 127. The monotonic current generators 130 compute terms proportional to $(y_k-h_kT_z)^2$ µsing the 3-bit evaluation weights, and the distance score digitizer 132 converts the aggregate current to a digital value representing $\|y-Hz\|^2$. This distance score indicates the quality of the current solution.

Simultaneously, at block 320, the LS-CIM system 100 applies stochastic feedback to the binary states 140. The stochastic feedback generator 124 of FIG. 1 combines the binary states 140 with pseudo-random bits through logic operations (AND, OR, XOR) to inject controlled noise. This noise enables the optimization to escape local minima and explore the solution space more effectively. The modified states are level-shifted by the level shifters 126 and fed back to the 8T-SRAM array 116 for the next iteration.

At decision block 322, the LS-CIM system 100 determines whether convergence has been reached. The convergence criteria may operate in one of two modes. In constant time mode (CTM), the LS-CIM system 100 checks whether a predetermined time duration (such as 720 μs) has elapsed. In dynamic time mode (DTM), the LS-CIM system 100 checks whether the binary states have stabilized by computing the Hamming distance between successive state vectors and comparing the Hamming distance to a threshold. The controller 106 of FIG. 1 can perform this convergence detection.

If convergence has not been reached (NO branch), the method 300 returns to block 314 to perform another iteration of analog current accumulation with the updated neuron states. This iterative process continues, with each iteration potentially improving the solution quality.

If convergence has been reached (YES branch), the method 300 proceeds to block 324 where the system outputs the integer solution vector (Z). The output vector (Z) corresponds to the output 114 of FIG. 1 and provides a 16-element vector where each element is a 2-bit integer (0, 1, 2, or 3). The conversion from 32 binary states to 16 integer values uses the inverse of the binary expansion performed in block 304, where $z_i = x_{2i-1} + 2x_{2i}$.

The method 300 achieves high-quality solutions through the combination of parallel analog computation, stochastic optimization, and continuous evaluation. The iterative nature allows the Hopfield network to converge to energy minima corresponding to good solutions of the original ICLS problem, while the stochastic feedback helps avoid poor local minima. The dual-mode convergence detection provides flexibility between fixed-time operation for predictable latency and dynamic operation for faster solutions when possible.

Figure 4A:
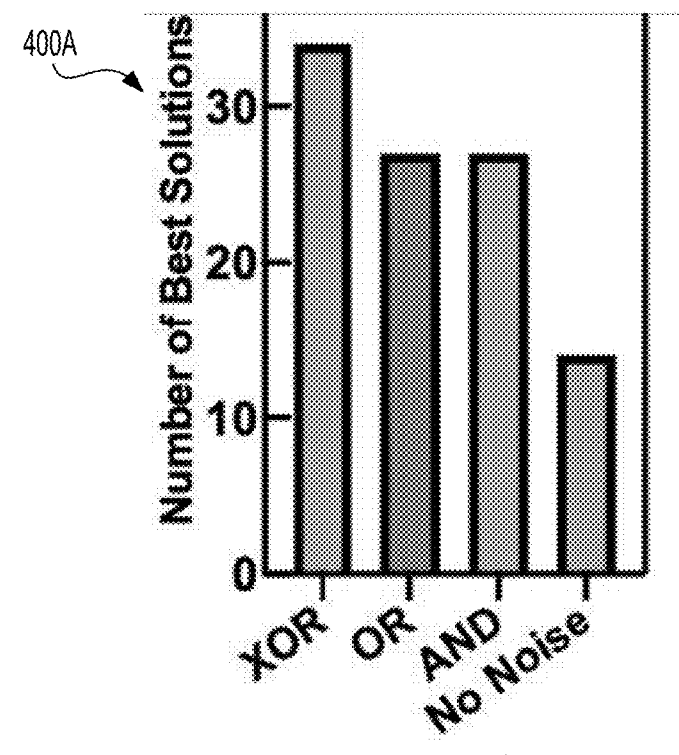
FIG. 4A depicts a bar chart showing noise optimization results comparing the number of best solutions achieved using different stochastic feedback methods according to an example implementation.

FIG. 4A depicts noise optimization results 400A showing the impact of different stochastic feedback mechanisms on solution quality for ICLS problems according to an example implementation. The noise optimization results 400A are presented as a bar chart comparing the number of best solutions achieved using different noise injection methods during the iterative optimization process.

The bar chart includes four categories of noise injection along the horizontal axis: XOR, OR, AND, and No Noise. The vertical axis represents the number of best solutions obtained out of a test set of random problems. Each bar indicates how many times each noise injection method produced the highest quality solution compared to the other methods.

The XOR noise injection method produces approximately 33 best solutions, representing the highest performance among all tested methods. This demonstrates that XOR-based stochastic feedback, as implemented by the stochastic feedback generator 124 of FIG. 1 using XOR logic gates to combine pseudo-random bits with binary neuron states, provides the most effective mechanism for escaping local minima during optimization.

The OR noise injection method produces approximately 26 best solutions, showing moderate effectiveness. The AND noise injection method also produces approximately 26 best solutions, demonstrating comparable performance to the OR method. These methods, while effective, do not achieve the same level of optimization performance as the XOR method.

The No Noise condition produces approximately 14 best solutions, the lowest among all tested conditions. This result confirms that stochastic feedback is beneficial in achieving high-quality solutions, as the deterministic operation without noise injection tends to become trapped in local minima.

The noise optimization results 400A in FIG. 4A validate the importance of the stochastic feedback generator 124 in the system architecture and demonstrate that the specific choice of noise injection logic significantly impacts solution quality. The superiority of XOR noise injection may be attributed to its balanced randomization properties, which provide sufficient perturbation to escape local minima while maintaining convergence toward optimal solutions. These results were obtained from testing 100 random ICLS problems with Gaussian-distributed H matrices, providing statistical validation of the noise optimization approach.

Figure 4B:
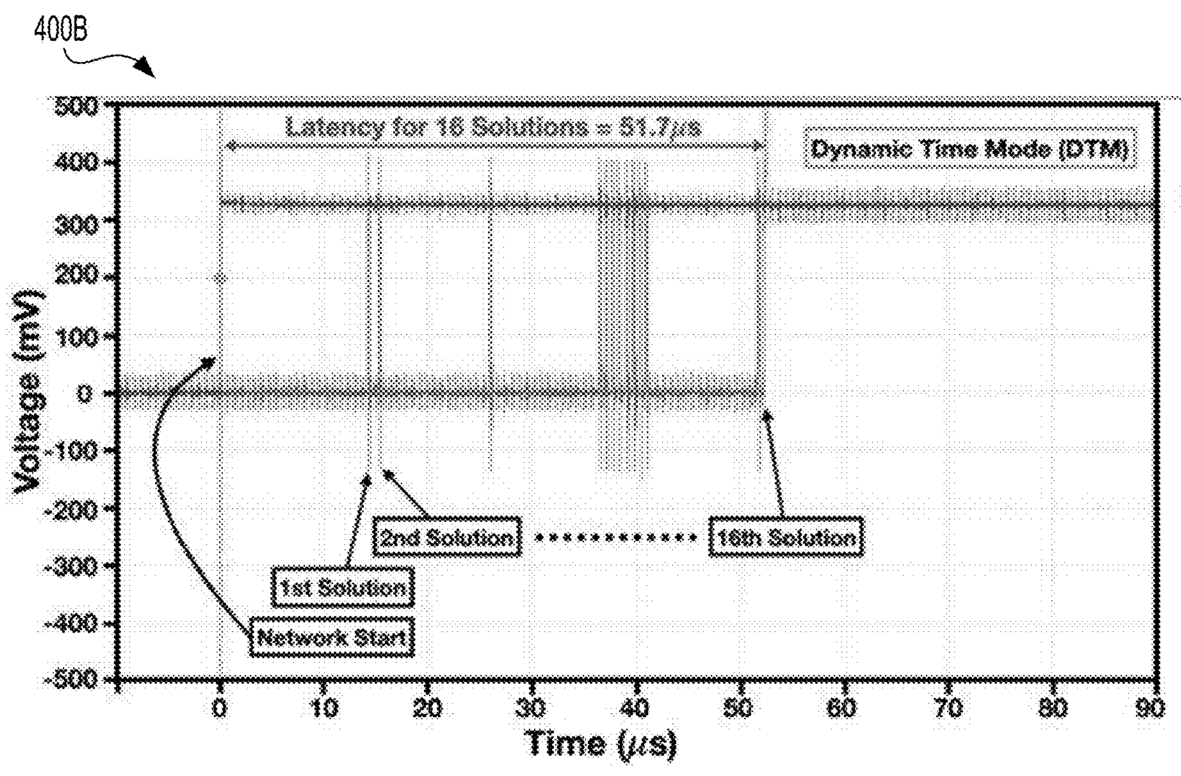
FIG. 4B depicts a time-domain voltage plot showing dynamic time mode operation with convergence behavior and solution identification over 51.7 microseconds according to an example implementation.

FIG. 4B depicts a dynamic time mode (DTM) operation 400B showing voltage dynamics and convergence behavior during iterative optimization according to an example implementation. The figure presents a time-domain plot demonstrating how the LS-CIM system 100 converges to solutions when operating in DTM, where computation continues until convergence criteria are met rather than for a fixed duration.

The plot shows voltage (in millivolts) on the vertical axis ranging from −500 mV to 500 mV, and time (in microseconds) on the horizontal axis spanning from 0 to 90 μs. The voltage trace represents the aggregate behavior of the binary neuron states as they evolve during the optimization process in the HN-CIM block 102.

At the beginning of the trace, marked as "Network Start," the LS-CIM system 100 initializes and begins the iterative optimization process. The voltage signal shows rapid fluctuations as the binary states 140 change during the initial iterations, reflecting the LS-CIM system exploring the solution space through the Hopfield network dynamics.

The "1st Solution" is identified early in the operation, where the voltage pattern shows a distinct stabilization. This represents the first convergence point where the binary states 140 generated by the comparators 122 satisfy the convergence criteria, potentially representing a local minimum in the energy landscape.

The "2nd Solution" appears after the first solution, demonstrating that the stochastic feedback generator 124 successfully perturbed the LS-CIM system 100 out of the first solution to explore other regions of the solution space. The LS-CIM system 100 continues iterating through multiple solutions, as indicated by the dotted line extending to the "16th Solution."

The annotation "Latency for 16 Solutions=51.7 μs" indicates that the LS-CIM system 100 can generate and evaluate 16 different candidate solutions within 51.7 μs when operating in DTM. This time period represents the time until the binary states 140 stabilize such that the Hamming distance between successive state vectors falls below a threshold, as detected by the controller 106. This rapid solution generation is enabled by the parallel analog computation in the 8T-SRAM array 116 and the efficient convergence detection.

The DTM operation demonstrated in FIG. 4B achieves significantly lower latency compared to the constant time mode (CTM), which operates for a fixed 720 μs. The DTM operation with 51.7 μs latency represents approximately a 14× reduction in computation time while maintaining high solution quality. This operational flexibility enables the LS-CIM system 100 to balance between solution quality and computation time based on application requirements.

The voltage fluctuations throughout the trace reflect the continuous evaluation by the DC-CIM block 104, which computes distance scores while the HN-CIM block 102 performs optimization, allowing the LS-CIM system 100 to track solution quality throughout the iterative process.

Figure 4C:
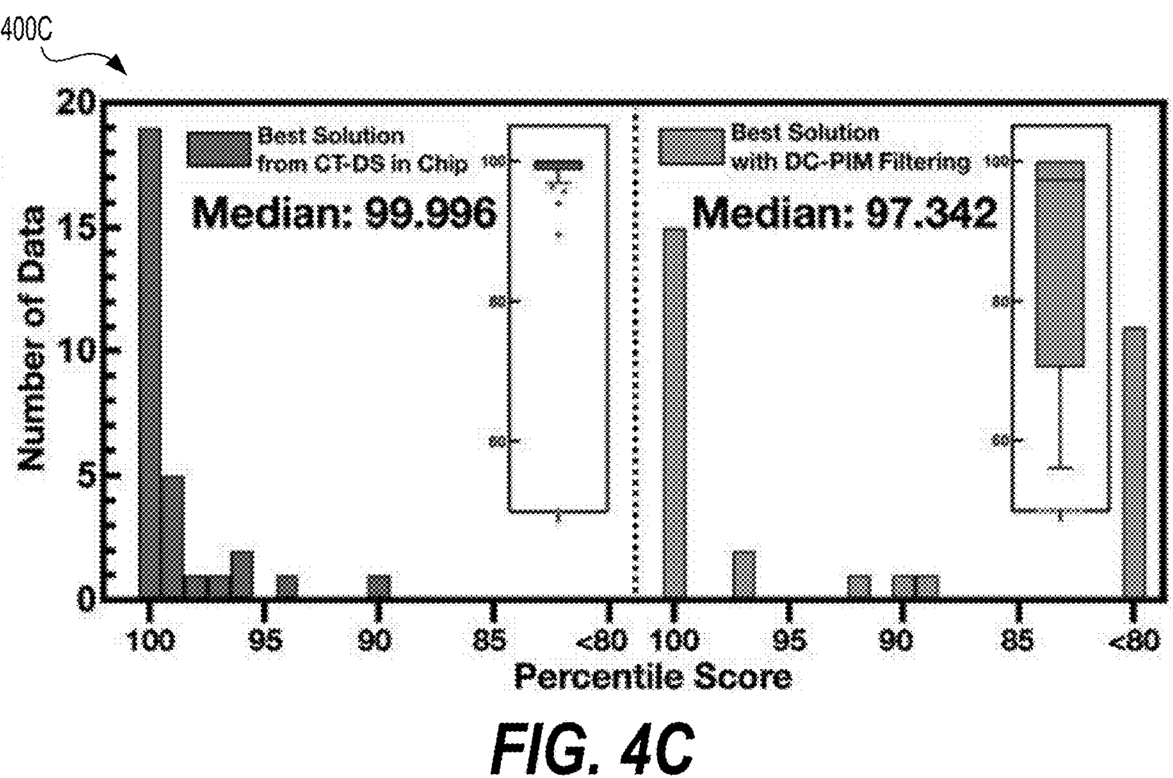
FIG. 4C depicts histogram distributions comparing solution quality for dynamic time mode operation with different solution selection strategies according to an example implementation.

FIG. 4C depicts solution quality distributions 400C for DTM operation comparing different solution selection strategies according to an example implementation. The figure presents histogram data showing the distribution of solution quality across 100 random ICLS problems tested using the LS-CIM system 100.

The figure contains two histogram distributions comparing solution quality metrics. The horizontal axis represents the percentile score ranging from less than 80 to 100, where higher percentile scores indicate better solution quality relative to 10 million randomly generated solutions. The vertical axis shows the number of data points (problem instances) achieving each percentile score range.

The left histogram shows "Best Solution from CT-DS in Chip" with a median of 99.996. This distribution represents solutions obtained directly from the continuous-time dynamical system implemented in the HN-CIM block 102 without additional filtering. The distribution is highly concentrated near the 100th percentile, with most solutions achieving percentile scores above 99.99. This high concentration demonstrates that the Hopfield network dynamics implemented through the analog current accumulation in the 8T-SRAM array 116 and the stochastic feedback generator 124 effectively find near-optimal solutions.

The right histogram shows "Best Solution with DC-PIM Filtering" with a median of 97.342. This distribution represents solutions selected based on the distance scores computed by the DC-CIM block 104 using the monotonic current generators 130 and distance score digitizer 132. While still achieving high-quality solutions with most results above the 95th percentile, the median is lower than the direct CT-DS solutions. The box plot overlay shows the interquartile range and outliers, indicating greater variability in solution quality when relying on the DC-CIM block 104 for solution selection.

The comparison reveals that in DTM operation with its shorter 51.7 μs latency, the direct solutions from the HN-CIM block 102 achieve superior quality compared to those filtered by distance score evaluation. This difference may be attributed to the rapid convergence in DTM not allowing sufficient time for the DC-CIM block 104 to fully evaluate all candidate solutions, or potential quantization effects from the 3-bit evaluation weights 136 compared to the 4-bit optimization weights 134.

The results in FIG. 4C demonstrate that the LS-CIM system 100 achieves high-quality solutions even in the faster DTM operation, with median percentile scores of 99.996 and 97.342 for the two selection strategies. These results validate the effectiveness of the mixed signal computing approach for solving ICLS problems with significant speedup while maintaining solution quality.

Figure 4D:
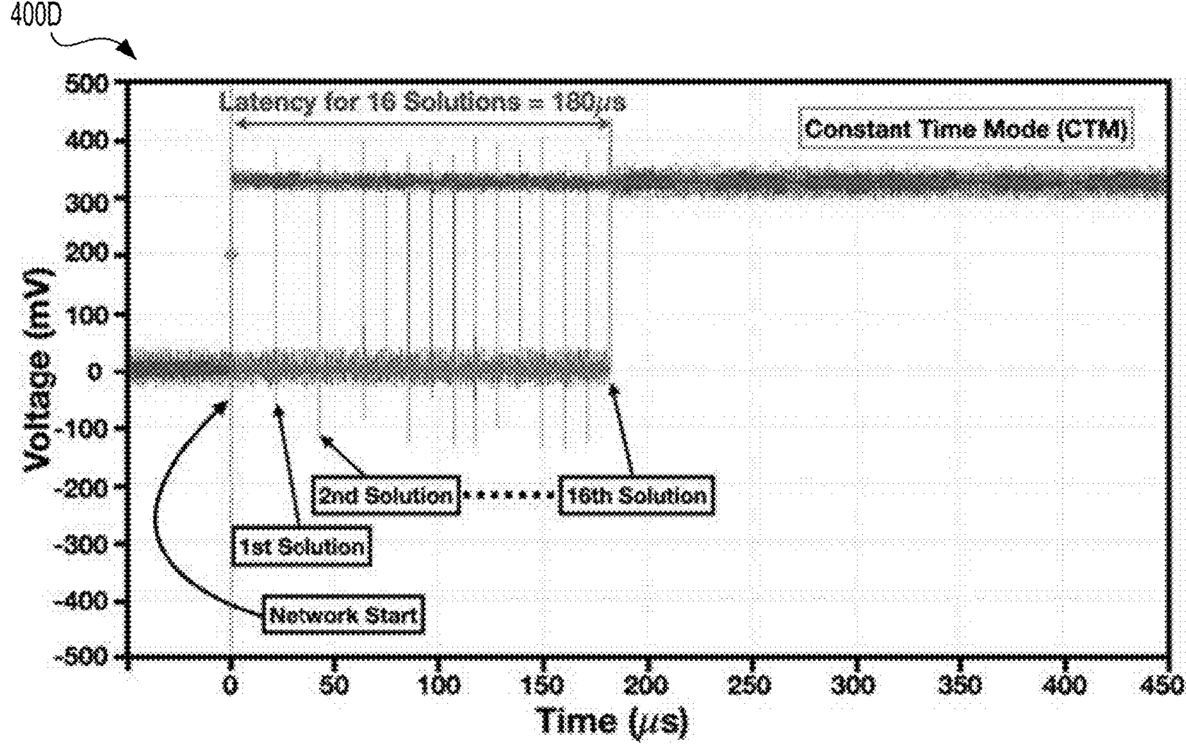
FIG. 4D depicts a time-domain voltage plot showing constant time mode operation with solution identification over a fixed computation period according to an example implementation.

FIG. 4D depicts constant time mode (CTM) operation 400D showing voltage dynamics over a fixed computation duration according to an example implementation. The figure presents a time-domain plot demonstrating how the LS-CIM system 100 operates when running for a predetermined time period rather than until convergence.

The plot shows voltage (in millivolts) on the vertical axis ranging from −500 mV to 400 mV, and time (in microseconds) on the horizontal axis spanning from 0 to 450 μs. The voltage trace represents the aggregate behavior of the binary neuron states 140 during the optimization process in the HN-CIM block 102.

At the beginning marked as "Network Start," the LS-CIM system 100 initializes and begins iterative optimization. The voltage signal exhibits rapid fluctuations during the initial phase as the binary states 140 generated by the comparators 122 change frequently while exploring the solution space through the Hopfield network dynamics.

The "1st Solution" is identified early in the operation where the voltage pattern shows initial stabilization. The "2nd Solution" follows, demonstrating that the stochastic feedback generator 124 continues to inject noise through the feedback path 142, preventing the LS-CIM system 100 from remaining trapped in local minima. The LS-CIM system 100 continues discovering solutions through the "16th Solution" as indicated by the dotted line progression.

The annotation "Latency for 16 Solutions=180 μs" indicates that in CTM operation, the LS-CIM system 100 generates 16 candidate solutions within 180 microseconds. This is notably longer than the 51.7 μs required in DTM operation shown in FIG. 4B, but CTM continues running to explore more of the solution space.

CTM runs for a total of 720 μs, though only the first 450 μs is shown in this plot. The extended runtime allows the HN-CIM block 102 to perform more iterations with the stochastic feedback, potentially finding higher quality solutions than the faster DTM operation.

During CTM operation, the stochastic feedback generator 124 cycles through four different noise injection modes, i.e., XOR, OR, AND, and no noise, with each mode operating for approximately 180 μs. This sequential evaluation of different noise patterns (4×180 μs=720 μs) allows the HN-CIM block 102 to explore the solution space using different perturbation strategies, with the XOR mode typically yielding the highest quality solutions as shown in FIG. 4A. The 16 candidate solutions are generated within the first 180 μs of operation.

Throughout the CTM operation, the voltage trace shows continued activity with periodic solution discoveries. The analog current accumulation in the 8T-SRAM array 116 continuously computes weighted sums while the DC-CIM block 104 evaluates solution quality in parallel. The controller 106 tracks all discovered solutions during the fixed time window, allowing selection of the best solution at the end of the 720 μs period.

The CTM operation demonstrated in FIG. 4D provides predictable latency suitable for real-time applications where consistent timing is critical, while still achieving the high solution quality enabled by the mixed signal computing architecture of the LS-CIM system 100.

Figure 4E:
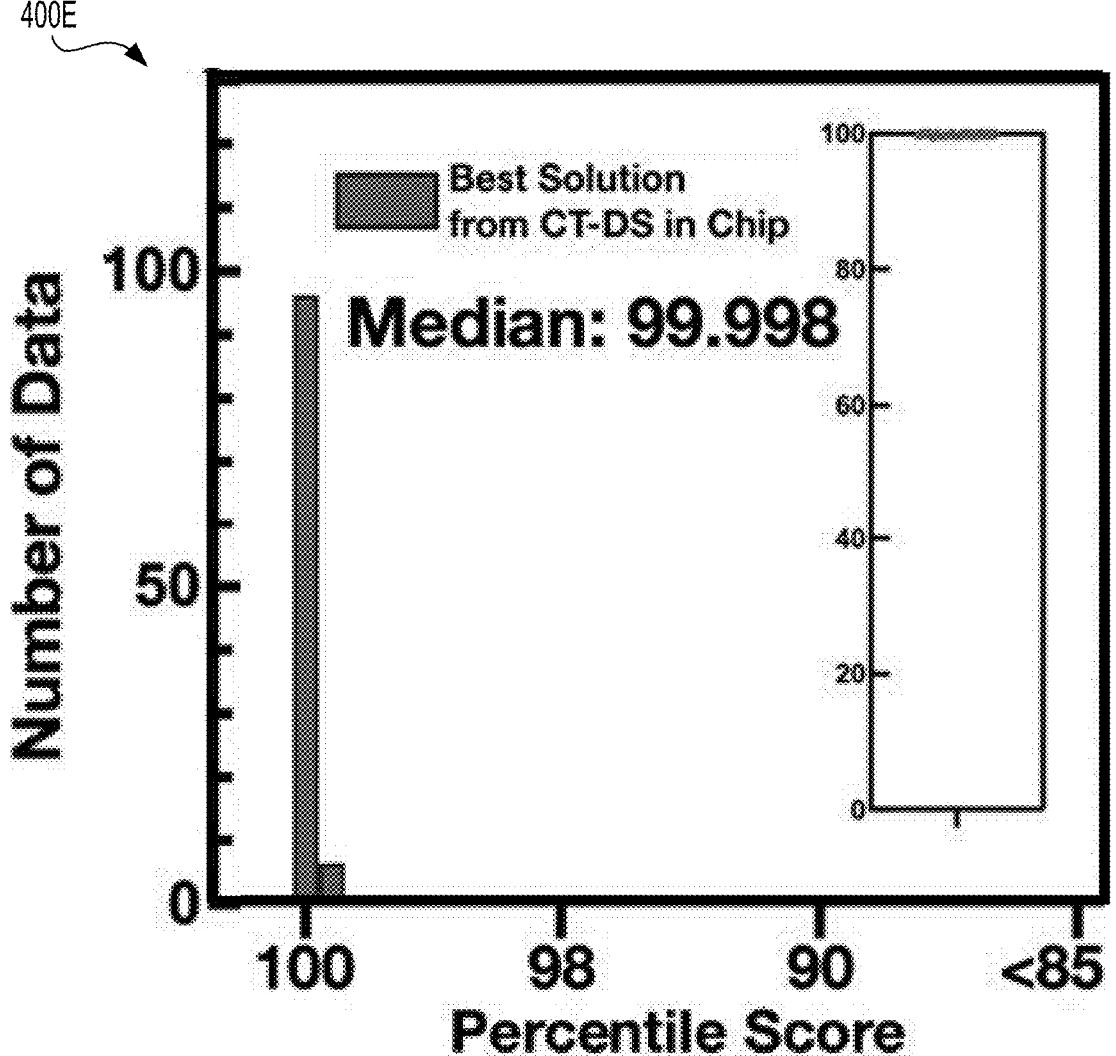
FIG. 4E depicts a histogram distribution showing solution quality for constant time mode operation using direct continuous-time dynamical system solutions according to an example implementation.
Figure 4F:
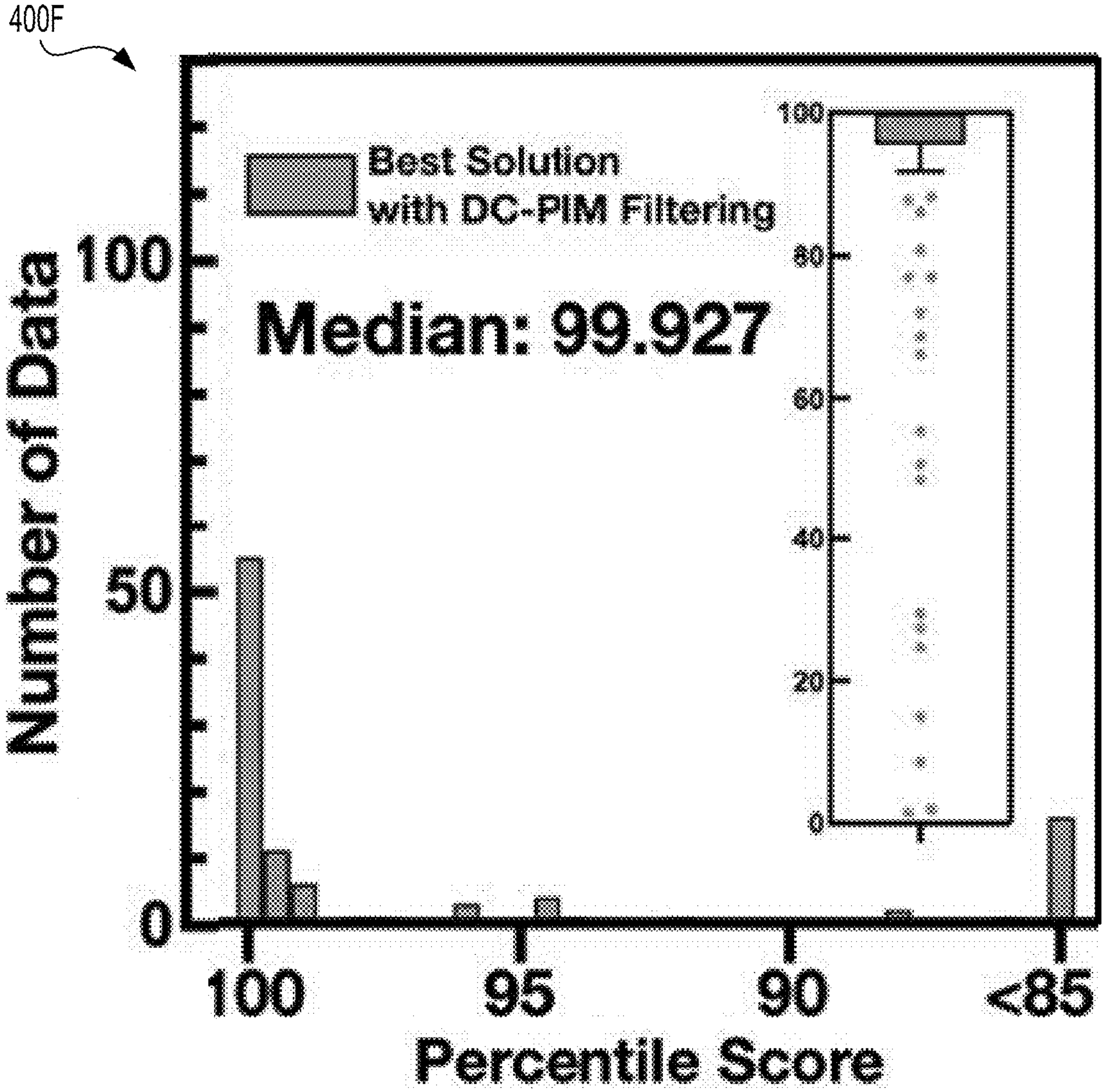
FIG. 4F depicts a histogram distribution showing solution quality for constant time mode operation using distance-based filtering according to an example implementation.
Figure 4G:
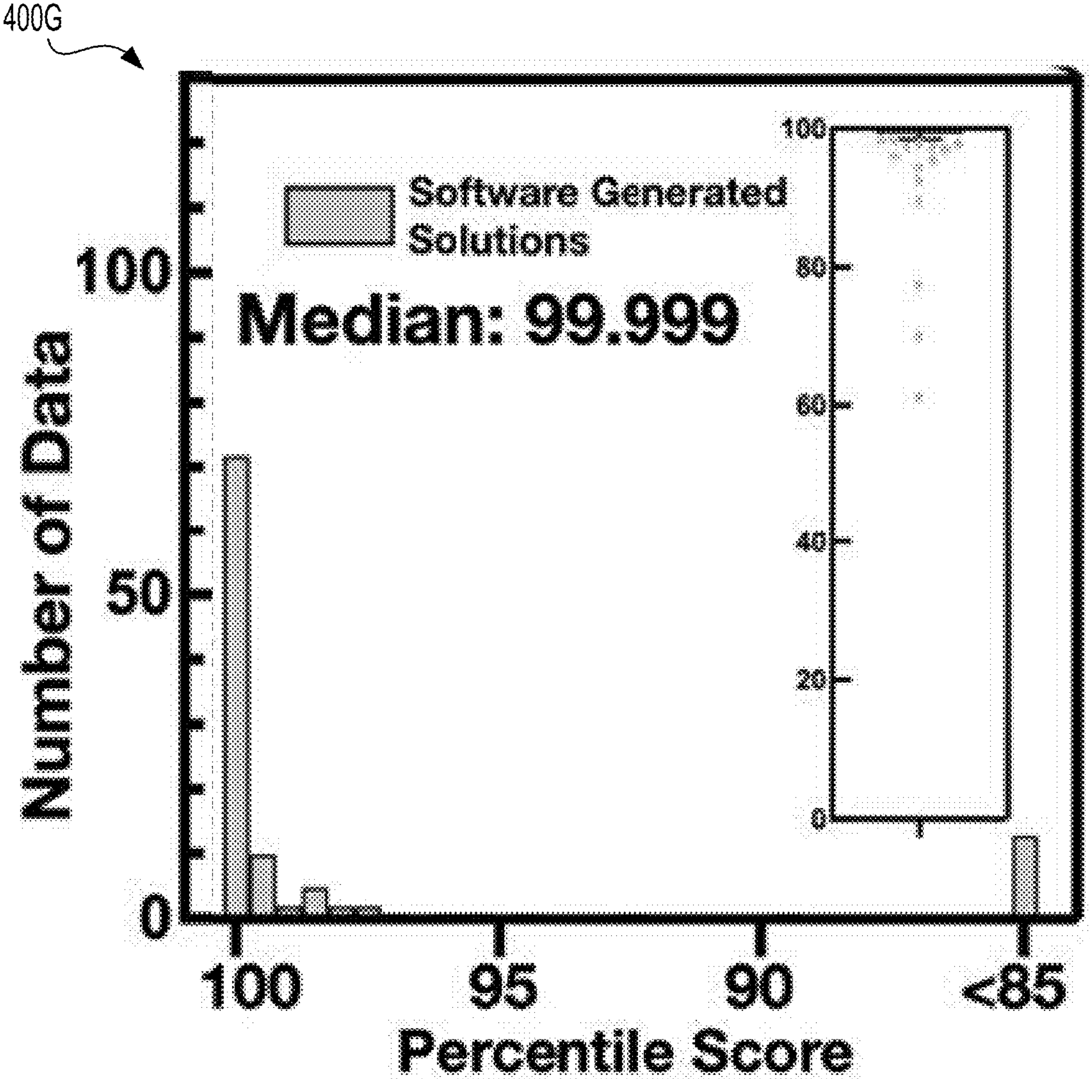
FIG. 4G depicts a histogram distribution showing baseline solution quality achieved by software-based solvers according to an example implementation.

FIGS. 4E, 4F, and 4G depict solution quality comparisons 400E, 400F, and 400G showing the distribution of solution quality for CTM operation across different solution sources according to an example implementation. The figures present histogram data comparing the LS-CIM system 100 performance against software baseline solutions for 100 random ICLS problems.

Each figure shows a histogram with the horizontal axis representing percentile score ranging from less than 85 to 100, where higher percentile scores indicate better solution quality relative to 10 million randomly generated solutions. The vertical axis shows the number of data points achieving each percentile score range. The percentile scores are computed as the rank of $$\frac{\|y - Hz\|^2}{y^2}$$

among the randomly generated solutions.

FIG. 4E shows the "Best Solution from CT-DS in Chip" with a median of 99.998. This distribution represents solutions obtained directly from the continuous-time dynamical system implemented in the HN-CIM block 102 after 720 μs of CTM operation. Nearly all 100 test problems achieve solutions above the 99.99th percentile, with the vast majority clustered at the highest percentile range. This exceptional performance demonstrates that the extended runtime of CTM allows the Hopfield network dynamics, implemented through analog current accumulation in the 8T-SRAM array 116 with stochastic feedback from generator 124, to thoroughly explore the solution space and converge to near-optimal solutions.

FIG. 4F shows the "Best Solution with DC-PIM Filtering" with a median of 99.927. This distribution represents solutions selected based on the distance scores computed by the DC-CIM block 104 using the monotonic current generators 130. While slightly lower than the direct CT-DS solutions, the median still exceeds the $99.9^{th}$ percentile. The distribution shows more spread, with some solutions in the $100^{th}$ percentile bin and others distributed across the 95-100 percentile range. The box plot overlay indicates the interquartile range remains tightly clustered near the maximum, validating the effectiveness of the distance computation approach using 3-bit evaluation weights 136.

FIG. 4G shows the "Software Generated Solutions" with a median of 99.999, serving as the baseline comparison. These solutions were generated using CVXPY running on an 8-core M1 processor, requiring approximately 2 seconds per problem. The software solutions achieve marginally higher median quality than the hardware implementations, as expected from an exhaustive algorithmic approach without quantization constraints.

Comparing the three distributions reveals that the LS-CIM system 100 achieves solution quality within 0.001 percentile points of software solutions (99.998 vs 99.999) while providing a 2900× speedup (720 μs vs 2 s). The DC-CIM filtered solutions achieve 99.927 median percentile, still representing exceptional quality above the 99.9th percentile. These results demonstrate that the mixed signal computing approach with 4-bit optimization weights 134 and 3-bit evaluation weights 136 maintains near-optimal solution quality despite quantization, validating the effectiveness of the weight quantization block 208 transformation shown in FIG. 2.

The consistent high performance across all 100 random problems with Gaussian-distributed H matrices confirms the robustness of the LS-CIM system 100 architecture for solving ICLS problems with significant computational acceleration while maintaining solution quality comparable to software implementations.

Figure 5:
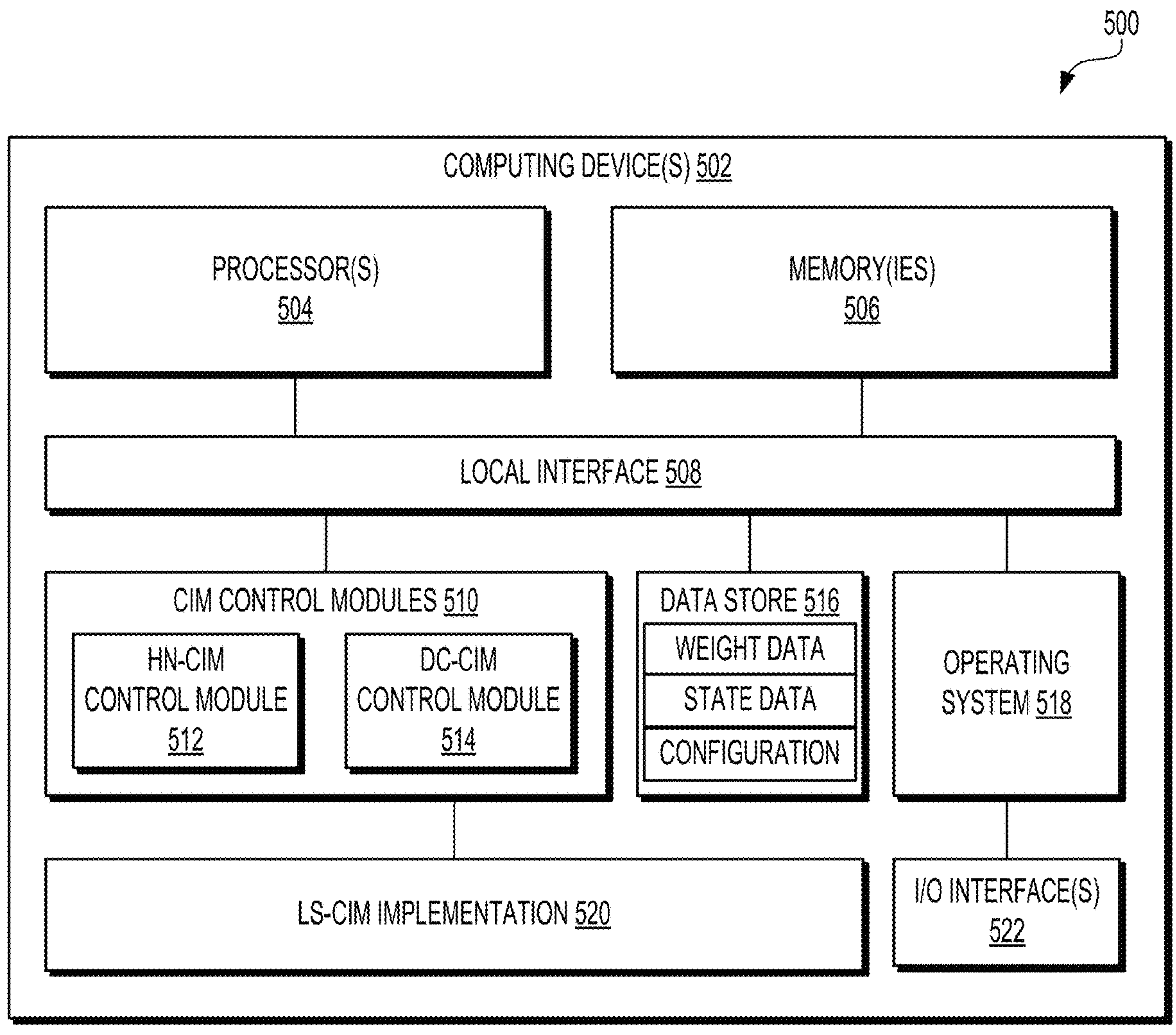
FIG. 5 depicts a schematic block diagram of a computing environment in which the LS-CIM system can be implemented according to an example implementation.

FIG. 5 depicts a computing environment 500 in which the LS-CIM system 100 for solving ICLS problems can be implemented according to various aspects of the present disclosure. The computing environment 500 provides the hardware and software infrastructure within which LS-CIM processing operations as described above can be implemented.

The computing environment 500 includes one or more computing devices 502. Each computing device 502 may include one or more server computers, workstations, personal computers, embedded systems, field-programmable gate arrays (FPGAs), application-specific integrated circuits (ASICs), system-on-chip (SoC) devices, or other computing platforms capable of implementing the LS-CIM system 100. The computing device 502 provides the computational infrastructure for implementing the mixed signal CIM arrays and associated control logic.

One or more processors 504 are included within the computing device 502. The processors 504 may include central processing units (CPUs), graphics processing units (GPUs), neural processing units (NPUs), digital signal processors (DSPs), or other processing elements capable of executing instructions and coordinating the LS-CIM operations. The processors 504 execute control logic for managing the mixed signal CIM arrays, coordinating data flow between components, and interfacing with external systems. In some implementations, the processors 504 may include specialized hardware accelerators designed to support the LS-CIM system 100.

One or more memories 506 are coupled to the processors 504 through a local interface 508. The memories 506 may include volatile memory such as dynamic random access memory (DRAM) or static random access memory (SRAM), as well as non-volatile memory such as flash memory, solid-state drives (SSDs), or other persistent storage. The memories 506 store program instructions, configuration data, and temporary data used during LS-CIM operations. The memories 506 may also buffer the input vector (Y) 110 and matrix (H) 112 before processing, and store the output vector (Z) 114 after computation.

The local interface 508 facilitates communication between components within the computing device 502. The local interface 508 may include one or more buses, interconnects, or communication fabrics such as Advanced extensible Interface (AXI), Peripheral Component Interconnect Express (PCIe), or other suitable interconnection technologies. The local interface 508 enables high-bandwidth, low-latency communication between the processors 504, memories 506, and other components to support real-time LS-CIM processing requirements.

CIM control modules 510 are coupled to the local interface 508 and provide specialized control functions for the LS-CIM system 100. The CIM control modules 510 include software and/or hardware components that manage the operation of the mixed signal CIM arrays, coordinate data flow, and implement the ICLS computations. For example, the CIM control modules 510 can include an HN-CIM control module 512 and a DC-CIM control module 514.

The HN-CIM control module 512 manages the operation of the HN-CIM block 102 described with reference to FIGS. 1 and 2. The HN-CIM control module 512 controls the application of analog currents from the DACs 118 to the 8T-SRAM array 116, manages the BCA 120 operations, coordinates the comparators 122, and controls the stochastic feedback generator 124. The HN-CIM control module 512 may include digital control logic, timing generators, voltage reference circuits, and interface components necessary to operate the Hopfield network optimization engine.

The DC-CIM control module 514 manages the operation of the DC-CIM block 104 described with reference to FIGS. 1 and 2. The DC-CIM control module 514 controls the weight storage 128 operations, manages the monotonic current generators 130, and coordinates with the distance score digitizer 132 to compute solution quality metrics. The DC-CIM control module 514 implements the timing and control sequences necessary for evaluating the L2 distance $\|y-Hz\|^2$ in the analog domain.

A data store 516 is coupled to the local interface 508 and stores persistent data used by the LS-CIM implementation. The data store 516 may store weight data including the 4-bit optimization weights 134 for the HN-CIM block 102 and the 3-bit evaluation weights 136 for the DC-CIM block 104. The weight data represents the quantized values derived from the input matrix (H) 112 after transformation through the problem transformation framework 200 of FIG. 2. The data store 516 may store configuration data including parameters such as array dimensions (52×256), convergence thresholds, noise injection patterns, and operational mode settings (CTM/DTM).

An operating system 518 executes on the processors 504 and provides system-level services for the LS-CIM implementation. The operating system 518 may include a real-time operating system (RTOS), Linux, Windows, or other suitable operating system that supports the computational requirements of the LS-CIM architecture. The operating system 518 manages system resources, schedules tasks, handles interrupts, and provides interfaces for application software.

The LS-CIM implementation 520 represents the core ICLS problem-solving functionality implemented using the CIM arrays. The LS-CIM implementation 520 may include a combination of hardware components (such as the physical 8T-SRAM arrays, DACs, BCAs, comparators, and monotonic current generators) and software components (such as the controller 106 algorithms, convergence detection routines, and mode selection logic). The LS-CIM implementation 520 executes the method 300 described with reference to FIG. 3, processing ICLS problems through the mixed signal CIM arrays while maintaining analog computation efficiency.

One or more input/output (I/O) interfaces 522 provide connectivity between the computing device 502 and external systems or devices. The I/O interfaces 522 may include network interfaces (such as Ethernet, Wi-Fi, or InfiniBand), storage interfaces (such as Serial Advanced Technology Attachment (SATA), Non-Volatile Memory Express (NVMe), or Small Computer System Interface (SCSI)), display interfaces (such as High-Definition Multimedia Interface (HDMI) or DisplayPort), and other communication interfaces. The I/O interfaces 522 enable the computing device 502 to receive ICLS problem specifications and transmit solution vectors to external systems or storage devices.

The computing environment 500 may be scaled to support different application requirements. For edge computing applications in signal processing or wireless communications, the computing device 502 may be implemented as a compact, low-power system with integrated LS-CIM arrays achieving the 21.76 mW power consumption demonstrated in the implementation. For data center applications requiring high-throughput optimization, multiple computing devices 502 may be networked together to process larger problem sets or higher-dimensional matrices. The modular architecture enables flexible deployment across various computing platforms while maintaining the 2900× speedup advantage of the LS-CIM approach over traditional software solvers.

The features, structures, or characteristics described above may be combined in one or more implementations in any suitable manner, and the features discussed in the various implementations are interchangeable, if possible. In the foregoing description, numerous specific details are provided in order to fully understand the implementations of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims.

The terms "first," "second," etc. are used only as labels, rather than a limitation for a number of the objects. It is understood that if multiple components are shown, the components may be referred to as a "first" component, a "second" component, and so forth, to the extent applicable.

The above-described implementations of the present disclosure are merely possible examples set forth for a clear understanding of the principles of the disclosure. Many variations and modifications may be made to the above-described implementations without departing substantially from the spirit and principles of the disclosure. All such modifications and variations are intended to be included herein within the scope of this disclosure and protected by the following claims.

What is claimed is:

1. A system, comprising:

a memory interface configured to receive an input vector and a matrix;

a controller configured to transform an integer constrained least square (ICLS) problem into a Hopfield network energy function and generate quantized weights from the matrix;

a first computing-in-memory (CIM) component configured to perform iterative optimization, the first CIM component comprising:

a memory array configured to store first quantized weights;

a digital-to-analog converter (DAC) configured to convert elements of the input vector to analog currents;

a current accumulator configured to accumulate currents from the memory array based on the first quantized weights and the analog currents;

a comparator configured to generate binary states based on outputs from the current accumulator; and a stochastic feedback generator configured to modify the binary states with noise injection to generate feedback signals;

a second CIM component configured to evaluate solution quality, the second CIM component comprising:

weight storage configured to store second quantized weights; and a monotonic current generator configured to compute distance metrics using the binary states and the second quantized weights; and a distance score digitizer configured to convert aggregate currents from the monotonic current generator to digital distance scores.

2. The system of claim 1, wherein the controller is further configured to determine convergence based on the binary states and output an integer solution vector derived from the binary states.

3. The system of claim 1, wherein the first quantized weights comprise 4-bit values and the second quantized weights comprise 3-bit values.

4. The system of claim 1, wherein the memory array comprises an 8-transistor static random-access memory (8T-SRAM) array having separate read and write ports.

5. The system of claim 1, wherein the stochastic feedback generator comprises a pseudo-random number generator and one or more logic gates configured to combine random bits with the binary states.

6. The system of claim 5, wherein the one or more logic gates comprise XOR gates, AND gates, and OR gate configured to inject noise, and wherein the stochastic feedback generator is further configured to operate with or without noise injection.

7. The system of claim 1, wherein the controller is configured to operate in at least one of a constant time mode wherein computation continues for a predetermined duration, and a dynamic time mode wherein computation continues until a convergence criterion is satisfied.

8. The system of claim 1, wherein the controller transforms integer variables to binary variables using a binary expansion relationship.

9. The system of claim 1, wherein the current accumulator comprises a positive current accumulator using p-type metal-oxide semiconductor (PMOS) current mirror and a negative current accumulator using an n-type metal-oxide semiconductor (NMOS) current mirror.

10. The system of claim 1, further comprising a level shifter configured to adjust voltage levels of the feedback signals for application to the memory array.

11. The system of claim 1, wherein each monotonic current generator comprises a pull-up network and a pull-down network configured to generate maximum current when positive and negative input currents are substantially equal.

12. A mixed signal computing circuit, comprising:

a memory array having a plurality of memory cells arranged in rows and columns, wherein a first subset of rows is configured to receive analog input signals and a second subset of rows is configured to receive feedback signals;

conversion circuitry configured to generate the analog input signals from digital input values;

current accumulation circuitry coupled to columns of the memory array and configured to accumulate currents from activated memory cells;

comparison circuitry configured to generate binary output states based on accumulated currents from the current accumulation circuitry;

feedback generation circuitry configured to generate the feedback signals by modifying the binary output states with stochastic noise; and evaluation circuitry configured to compute a distance metric based on the binary output states and stored evaluation weights, wherein the evaluation circuitry comprises monotonic current generators that produce maximum current when positive and negative current contributions are balanced.

13. The mixed signal computing circuit of claim 12, wherein the memory array comprises 8-transistor static random-access memory (8T-SRAM) memory cells.

14. The mixed signal computing circuit of claim 12, wherein the conversion circuitry comprises 5-bit current-domain digital-to-analog converters.

15. The mixed signal computing circuit of claim 12, wherein the feedback generation circuitry comprises a linear feedback shift register for generating pseudo-random bits and combinational logic for combining the pseudo-random bits with the binary output states.

16. The mixed signal computing circuit of claim 12, wherein each monotonic current generator comprises:

a pull-up network implemented with one or more p-type metal-oxide semiconductor (PMOS) transistors; and a pull-down network implemented with one or more n-type metal-oxide semiconductor (NMOS) transistors.

17. A method, comprising:

receiving an input vector and a matrix defining an integer constrained least square (ICLS) problem;

transforming the ICLS problem into a Hopfield network energy function;

quantizing weights derived from the Hopfield network energy function into first quantized weights for optimization and second quantized weights for evaluation;

programming the first quantized weights into a first memory array and the second quantized weights into a second memory array;

iteratively performing analog current accumulation in the first memory array using the input vector and feedback signals to generate binary neuron states;

computing distance scores using the second memory array and the binary neuron states;

applying stochastic noise to the binary neuron states to generate the feedback signals;

determining whether a convergence criterion is satisfied; and outputting an integer solution vector derived from the binary neuron states when the convergence criterion is satisfied.

18. The method of claim 17, wherein applying stochastic noise comprises combining the binary neuron states with pseudo-random bits using one of XOR, OR, or AND operations, or feeding back the binary neuron states without noise injection.

19. The method of claim 17, wherein determining whether the convergence criterion is satisfied comprises at least one of determining whether a predetermined time duration has elapsed in a constant time mode, and determining whether a Hamming distance between successive binary neuron states falls below a threshold in a dynamic time mode.

20. The method of claim 17, wherein the first quantized weights are quantized to 4-bit precision and the second quantized weights are quantized to 3-bit precision.

* * * * *